US011016911B2

(12) United States Patent
Balasubramani et al.

(10) Patent No.: US 11,016,911 B2
(45) Date of Patent: May 25, 2021

(54) NON-VOLATILE MEMORY EXPRESS OVER FABRIC MESSAGES BETWEEN A HOST AND A TARGET USING A BURST MODE

(71) Applicant: SAMSUNG ELECTRONICS CO., LTD., Suwon-si (KR)

(72) Inventors: Muthazhagan Balasubramani, Tamilnadu (IN); Chirag Chinmay, Odisha (IN); Venkataratnam Nimmagadda, Karnataka (IN); Raphel David Johnson, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/549,476

(22) Filed: Aug. 23, 2019

(65) Prior Publication Data

US 2020/0065269 A1 Feb. 27, 2020

(30) Foreign Application Priority Data

Aug. 24, 2018 (IN) .............................. 201841031867
Aug. 22, 2019 (IN) .............................. 201841031867

(51) Int. Cl.
 G06F 3/00 (2006.01)
 G06F 13/16 (2006.01)
 G06F 15/173 (2006.01)
(52) U.S. Cl.
 CPC .... G06F 13/1668 (2013.01); G06F 15/17331 (2013.01)
(58) Field of Classification Search
 CPC ..................... G06F 13/1668; G06F 15/17331
 See application file for complete search history.

(56) References Cited

U.S. PATENT DOCUMENTS

| 9,342,448 | B2 | 5/2016 | Fitch et al. | |
|---|---|---|---|---|
| 9,483,431 | B2 | 11/2016 | Bergsten et al. | |
| 2013/0198311 | A1* | 8/2013 | Tamir | G06F 15/167 709/212 |
| 2015/0012607 | A1* | 1/2015 | Cayton | G06F 3/067 709/212 |
| 2015/0261434 | A1* | 9/2015 | Kagan | G06F 13/28 711/103 |

(Continued)

OTHER PUBLICATIONS

"NVME Over PCIe Using Fabrics Device Lending" by Markssuen et al., Aug. 2, 2019 (Year: 2019).*

*Primary Examiner* — Jing-Yih Shyu
(74) *Attorney, Agent, or Firm* — F. Chau & Associates, LLC

(57) ABSTRACT

Systems and methods for managing transfer of NVMeoF commands/responses between a host and a target are described. The systems and methods may initiate and convert at least one Input/Output request into at least one Non-Volatile Memory Express over Fabric (NVMeoF) command to access a storage device attached with the target device. A host may transmit the at least one NVMeoF command in a burst mode using a Remote Direct Memory Access (RDMA) Write packet to a pre-registered memory region of the target device. In response to reception of the at least one NVMeoF command, the target device may post at least one NVMeoF completion response corresponding to the at least one NVMeoF command using the RDMA Write packet to a pre-registered memory region of the host.

15 Claims, 13 Drawing Sheets

(56) References Cited

U.S. PATENT DOCUMENTS

| | | | |
|---|---|---|---|
| 2017/0177216 A1 | 6/2017 | Freyensee et al. | |
| 2017/0177541 A1* | 6/2017 | Berman | G06F 3/0656 |
| 2017/0286363 A1* | 10/2017 | Joshua | H04L 69/08 |
| 2018/0067685 A1* | 3/2018 | Deng | G06F 3/0613 |
| 2018/0095915 A1 | 4/2018 | Prabhakar et al. | |
| 2018/0188974 A1* | 7/2018 | Cayton | G06F 3/0611 |
| 2019/0384532 A1* | 12/2019 | Ananthapalli | G06F 3/0689 |
| 2020/0026656 A1* | 1/2020 | Liao | G06F 12/0284 |
| 2020/0218688 A1* | 7/2020 | Qu | G06F 15/17331 |

* cited by examiner

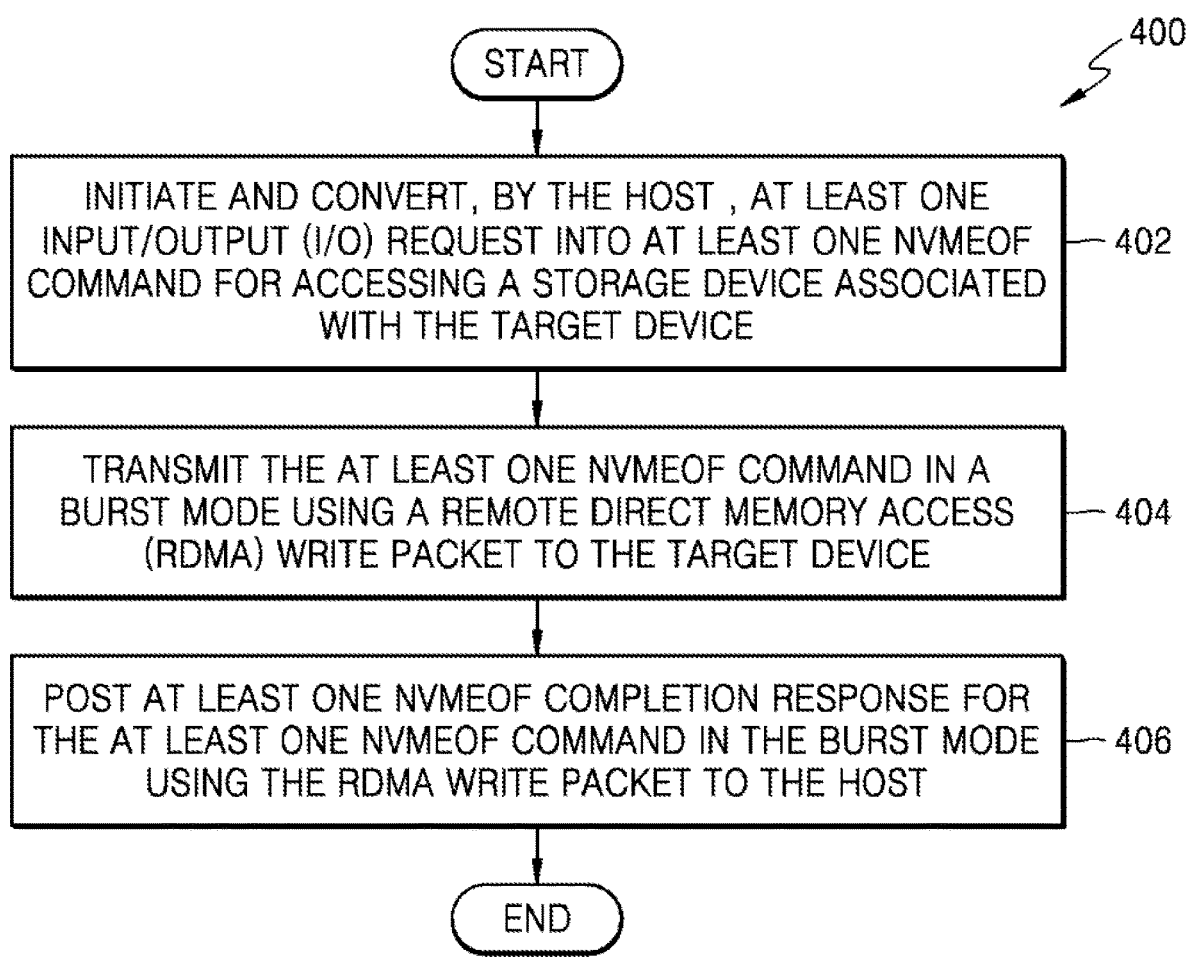

NON-VOLATILE MEMORY EXPRESS OVER FABRIC MESSAGES BETWEEN A HOST AND A TARGET USING A BURST MODE

CROSS REFERENCE TO RELATED APPLICATION

This application is based on and derives the benefit of Indian Provisional Application 201841031867 filed on Aug. 24, 2018 and Indian Patent Application No. 201841031867 filed on Aug. 22, 2019, the contents of which are incorporated herein by reference.

TECHNICAL FIELD

The present disclosure relates to the field of storage systems and more particularly to increasing Input/Output (I/O) throughput by managing transfer of Non-Volatile Memory Express over Fabric (NVMeoF) commands/responses between a host and a target device over a Remote Direct Memory Access (RDMA) network.

BACKGROUND

With the rapid advancement of technology and exponential growth of data, there has been an increase in demand for fast, low latency, distributed storage systems. Non-Volatile Memory Express over Fabric (NVMeoF) aims to meet this demand by delivering low latency, distributed, and secure storage systems to a user. NVMeoF provides a communication protocol that allows a host to access NVM subsystems (such as a non-volatile memory (NVM) controller, storage devices/Solid State device (SSD), etc) attached to a target device over a network (i.e., fabric) transport. NVMeoF supports various fabric transports such as: Remote Direct Memory Access (RDMA), Transmission Control Protocol (TCP), Fibre Channel (FC), but is not limited as such.

However, in some cases transmission of NVMeoF commands from a host to a target device can result in significant transport bandwidth overhead and may demand excessive hardware resource requirements in the target device.

SUMMARY

Embodiments of the present disclosure provide methods and systems for managing the transfer of Non-Volatile Memory Express over Fabric (NVMeoF) commands/responses between a host and a target device over a Remote Direct Memory Access (RDMA) network, wherein the NVMeoF commands are initiated in a burst mode.

Embodiments of the present disclosure provide methods and systems for using an RDMA Write packet for submitting the NVMeoF commands in the burst mode from the host to a pre-registered memory region of a Submission Queue (SQ) of the target device.

Embodiments of the present disclosure provide methods and systems for using the RDMA Write packet for submitting completion responses for the NVMeoF commands in the burst mode from the target device to a pre-registered memory region of a Completion Queue (CQ) of the host.

Accordingly, embodiments herein provide methods and systems for managing the transfer of Non-Volatile Memory Express over Fabric (NVMeoF) commands and NVMeoF responses between a host and a target device. A method disclosed herein includes initiating and converting, by the host, at least one Input/Output (I/O) request into at least one NVMeoF command for accessing a storage device associated with the target device. The method further includes transmitting, by the host, the at least one NVMeoF command in a burst mode using a Remote Direct Memory Access (RDMA) Write packet to the target device. The method further includes posting, by the target device, at least one NVMeoF completion response for the at least one NVMeoF command in the burst mode using the RDMA Write packet to the host.

Accordingly, embodiments herein provide a Non-Volatile Memory Express over Fabric (NVMeoF) system comprising a host and a target. The host is configured to initiate and convert at least one Input/output (I/O) request into at least one NVMeoF command for access to a storage device associated with the target device. The host is further configured for transmitting the at least one NVMeoF command in a burst mode using a Remote Direct Memory Access (RDMA) Write packet to the target device. The target device is configured for posting at least one NVMeoF completion response for the at least one NVMeoF command in the burst mode using the RDMA Write packet to the host.

These and other aspects of the example embodiments herein will be better appreciated and understood when considered in conjunction with the following description and the accompanying drawings. It should be understood that the following descriptions, while indicating example embodiments and numerous specific details thereof, are given by way of illustration and not of limitation. Many changes and modifications may be made within the scope of the example embodiments herein without departing from the spirit thereof, and the example embodiments herein include all such modifications.

BRIEF DESCRIPTION OF FIGURES

Embodiments herein are illustrated in the accompanying drawings throughout, which, like reference letters, indicate corresponding parts in the various figures. The embodiments herein will be better understood from the following description with reference to the drawings, in which:

FIG. 4 is a flow diagram illustrating a method for managing transfer of NVMeoF commands and NVMeoF responses from a host to a target device in a burst mode, according to embodiments of the present disclosure;

DETAILED DESCRIPTION

The example embodiments herein and the various features and details thereof are explained more fully with reference to the non-limiting embodiments that are illustrated in the accompanying drawings and detailed in the following description. Descriptions of well-known components and processing techniques are omitted as to not obscure the embodiments herein. The description herein is intended merely to facilitate an understanding of ways in which the example embodiments herein can be practiced and to further enable those of skill in the art to practice the example embodiments herein. Accordingly, this disclosure should not be construed as limiting the scope of the example embodiments herein.

Embodiments herein disclose methods and systems for managing transfer of Non-Volatile Memory Express over Fabric (NVMeoF) commands/responses between a host and a target device over a Remote Direct Memory Access (RDMA) network, wherein the NVMeoF commands can be initiated in a burst mode using an RDMA Write packet. Using the burst mode as described may enable NVMeoF operation with reduced transport bandwidth overhead, which may reduce the hardware resource requirements in the target device Non-Volatile Memory Express (NVMe) is an interface specification that allows fast access for direct-attached solid state devices. It supports next-generation solid-state storage technologies such as NAND flash. NVMe devices communicate directly with system Central Processing Unit (CPU) using high-speed PCIe connections. NVMeoF is a network protocol used to communicate between a host and a storage system over a network (i.e., the fabric). NVMeOF protocol operates based on Remote Direct Memory Access (RDMA).

RDMA supports zero-copy networking that allows application programmers to directly transfer data between user-space virtual memories on different machines without kernel intervention (Zero-Copy), thereby bypassing extra copying and processing steps. RDMA is message oriented as well as memory oriented, which treats network communication as a stream of bytes. This may result in a reduction in latency, a reduction in the overall involvement of the CPU and higher bandwidth.

Figure 1A:
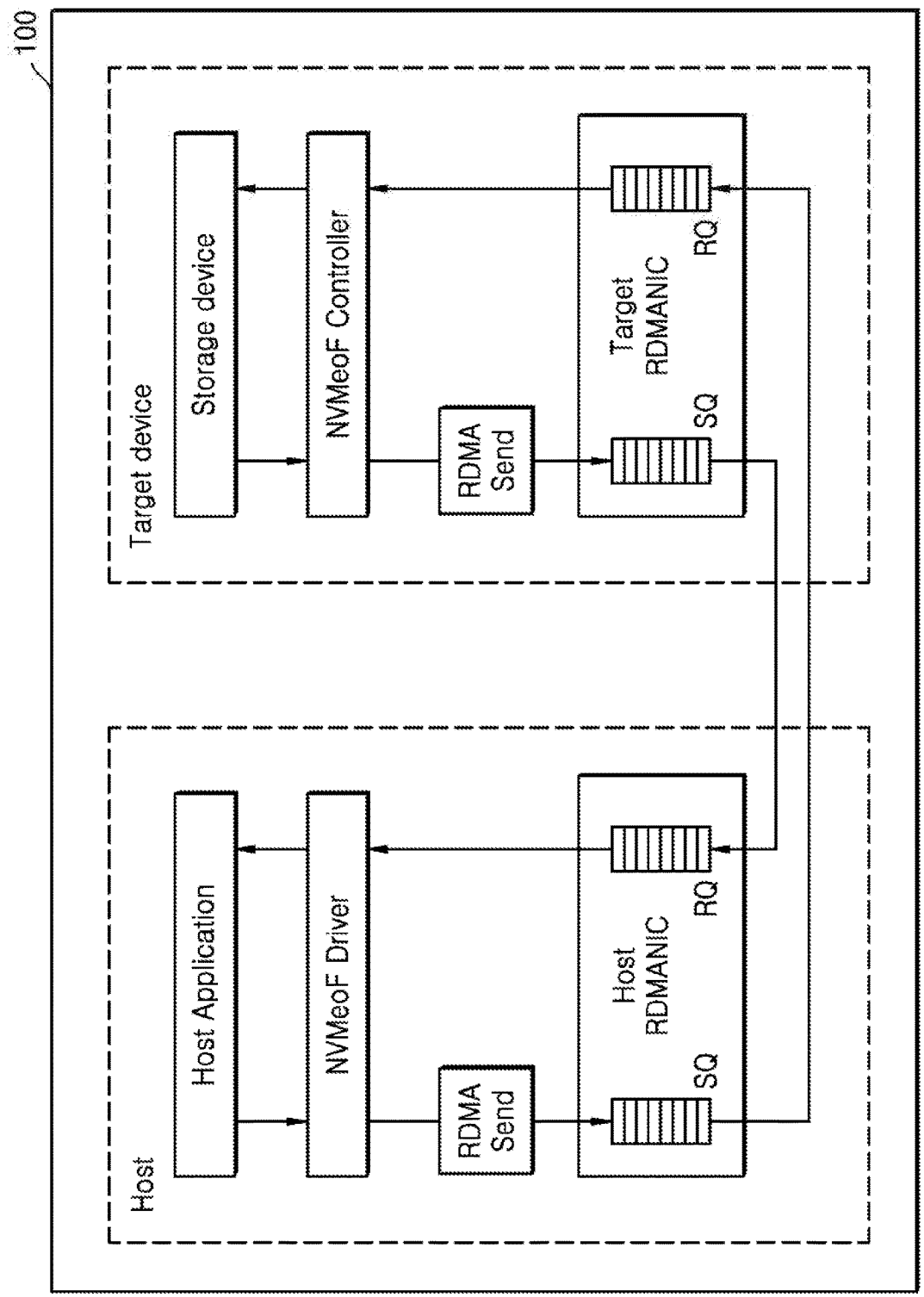
FIG. 1a is an example architecture of a Non-Volatile Memory Express over Fabric (NVMeoF) system.

FIG. 1a is an example architecture of an NVMeoF system 100. The NVMeoF system 100 includes a host and a target device. The host includes a host application, an NVMeoF driver, and a host RDMA network interface card (RNIC). The target device includes a storage device (such as an SSD device or a flash memory, but not limited as such) an NVMeoF controller, and a target RNIC.

At the host, the host application initiates an I/O request and sends a signal to the NVMeoF driver to initiate access (writing/reading) of data from the storage device of the target device. The NVMeoF driver receives the I/O request, translates the I/O request to an NVMeoF command and creates a Work Queue Element (WQE). Creating the WQE corresponding to the NVMeoF command involves the creation of Submission Queue entry. After the creation of the WQE, the NVMeoF driver posts the WQE to the host RNIC using an RDMA Send verb. The host RNIC receives the WQE and places the WQE in a Send Queue (SQ). Furthermore, the host RNIC collects the WQE from the SQ and adds protocol specific headers (such as RDMA over Converged Ethernet (RoCE)/Internet Wide-area RDMA Protocol (iWARP), etc), thus forming an RDMA Send packet for the WQE. The host RNIC sends the RDMA Send packet to the target RNIC.

At the target device, the target RNIC receives the RDMA Send packet and places the RDMA Send packet in a Receive Queue (RQ). Furthermore, the target RNIC removes the protocol specific headers from the RDMA Send packet and obtains the WQE. The target RNIC provides the obtained WQE to the NVMeoF controller. The NVMeoF controller receives the WQE corresponding to the NVMeoF command and starts Direct Memory Access (DMA) using at least one of an RDMA Write packet or an RDMA Read packet. For example, if the NVMeoF command appears to be a read command, the NVMeoF controller fetches data from the storage device and transmits the data to the host using RDMA Write packet(s). If the NVMeoF command appears to be a write command, the NVMeoF controller fetches data from the host using RDMA Read packet(s) and writes the fetched data to the storage device. Thereafter, the NVMeoF controller creates an NVMeoF specific completion entry/the WQE as a response to the NVMeoF command and sends the created entry to a Send Queue (SQ) of the target RNIC. Furthermore, the target RNIC collects the WQE (corresponding to the response for the NVMeoF Command) from the SQ and adds the protocol specific headers (RoCE/iWARP) to the WQE, thus forming a response packet for the corresponding NVMeoF Command. The target RNIC sends the response packet to the host RNIC using the RDMA Send packet.

At the host, the host RNIC receives the response packet from the target RNIC and stores the received response packet in the Receive Queue (RQ). Furthermore, the host RNIC removes the protocol specific headers from the response packet and obtains the WQE. The host RNIC further provides the obtained WQE to the NVMeoF driver. The NVMeoF driver then completes the I/O request and posts a response to the host application. Exchanging of the command packets and the response packets using the RDMA send packet for each I/O request results in the transport bandwidth overhead.

Figure 1B:
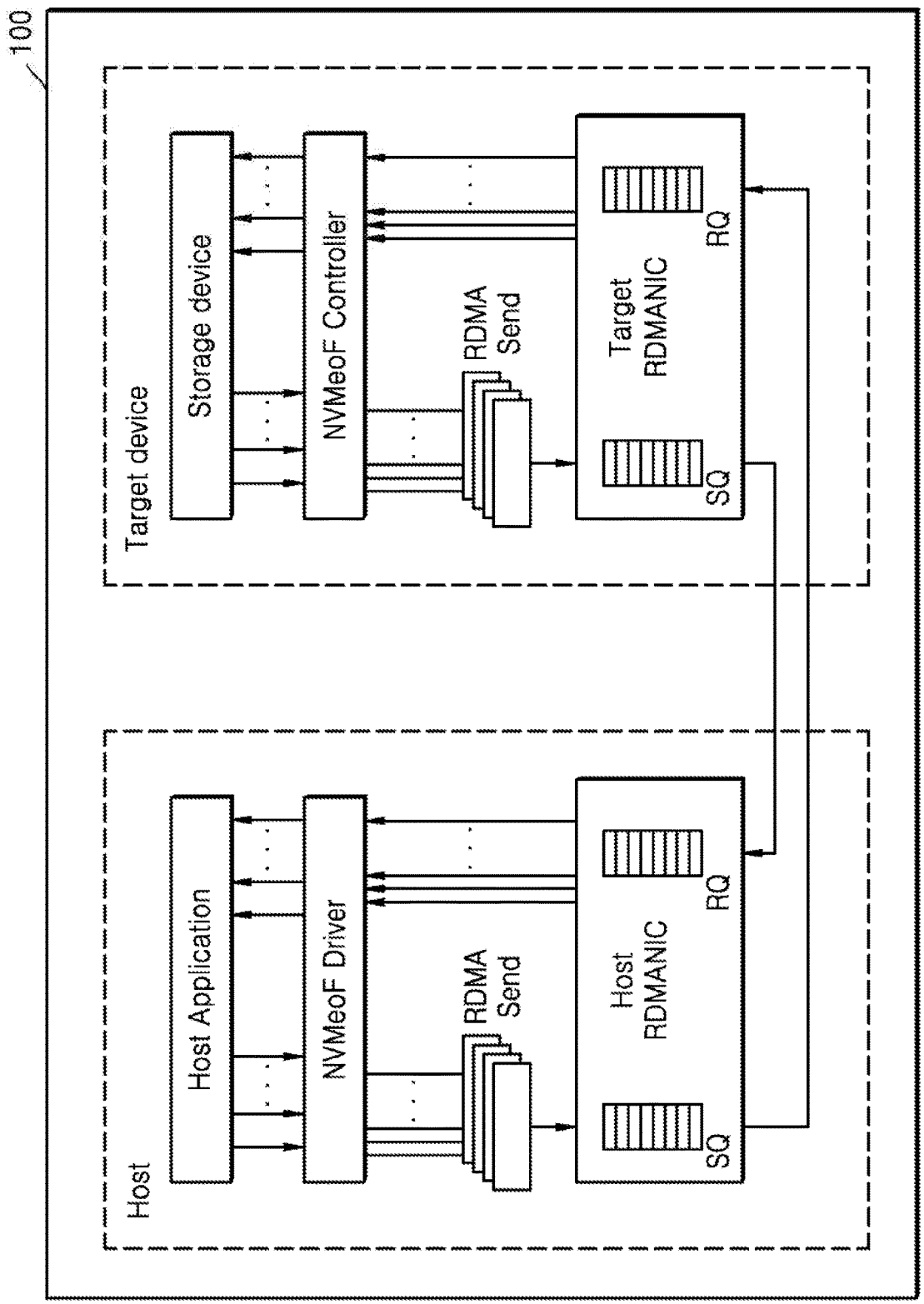
FIG. 1b is an example diagram illustrating transmission of at least one command packets by a host to a target device using Remote Direct Memory Access (RDMA) Send packets.

FIG. 1b is an example diagram illustrating transmission of at least one command packets by the host to the target device using the RDMA Send packets. The host application initiates at least one I/O requests for accessing the storage device attached with the target device. The host application submits the at least one I/O requests to the NVMeoF driver. The I/O request can include at least one of a read or write request. The NVMeoF driver translates the at least one I/O requests into NVMeoF commands which creates the WQE for each NVMeoF command. Creating the WQEs corresponding to the NVMeoF commands involves creation of at least one Submission queue entries. After the creation of at least one WQE's, the NVMeoF driver submits the WQEs to the host RNIC using the RDMA Send verbs. The host RNIC receives the at least one WQE's and places it in the Send Queue (SQ). Furthermore, the host RNIC collects the at least one WQE's from the SQ and adds the protocol specific headers to each WQE element, thus forming at least one RDMA Send packets for the at least one WQE's. The host RNIC then sends the at least one RDMA Send packets to the target RNIC.

At the target device, the target RNIC receives the RDMA Send packets and places the RDMA Send packets in a Receive Queue (RQ). The target RNIC then removes the protocol specific headers from the RDMA Send packets and obtains the at least one WQE's. The target RNIC sends the obtained at least one WQE's to the NVMeoF controller. The DMA begins using at least one of the RDMA Write or Frequency Division Multiple Access (FDMA) Read packets when the NVMeoF controller receives the WQE corresponding to NVMeoF commands. If the NVMeoF command appears to be a read command, the NVMeoF controller fetches data from the storage device and transmits the data to the host using the RDMA Write packet(s).

If the NVMeoF command appears to be a write command, the NVMeoF controller fetches data from the host using the RDMA Read packet(s) and writes the fetched data to the storage device. Then, the NVMeoF controller creates NVMe specific completion entries in response to the at least one NVMeoF commands and sends the created entries to the Send Queue (SQ) of the target RNIC. Furthermore, the target RNIC collects the WQEs (corresponding to the responses for the at least one NVMeoF Commands) from the SQ and adds the protocol specific headers, thus forming the response packets for the at least one NVMeoF Commands. The target RNIC sends the response packets to the host RNIC using the RDMA Send packets.

At the host, the host RNIC receives the response packets from the target RNIC and stores the response packets in the Receive Queue (RQ). Furthermore, the host RNIC removes the protocol specific headers from the response packets and obtains the at least one WQE's. The host RNIC further provides the at least one WQEs to the NVMeoF driver. The NVMeoF driver completes at least one I/O requests and posts the responses corresponding to the completions of the at least one I/O requests to the host application. Exchanging of the command packets and the response packets using the RDMA send packet for each I/O request results in the transport bandwidth overhead.

Figure 1C:
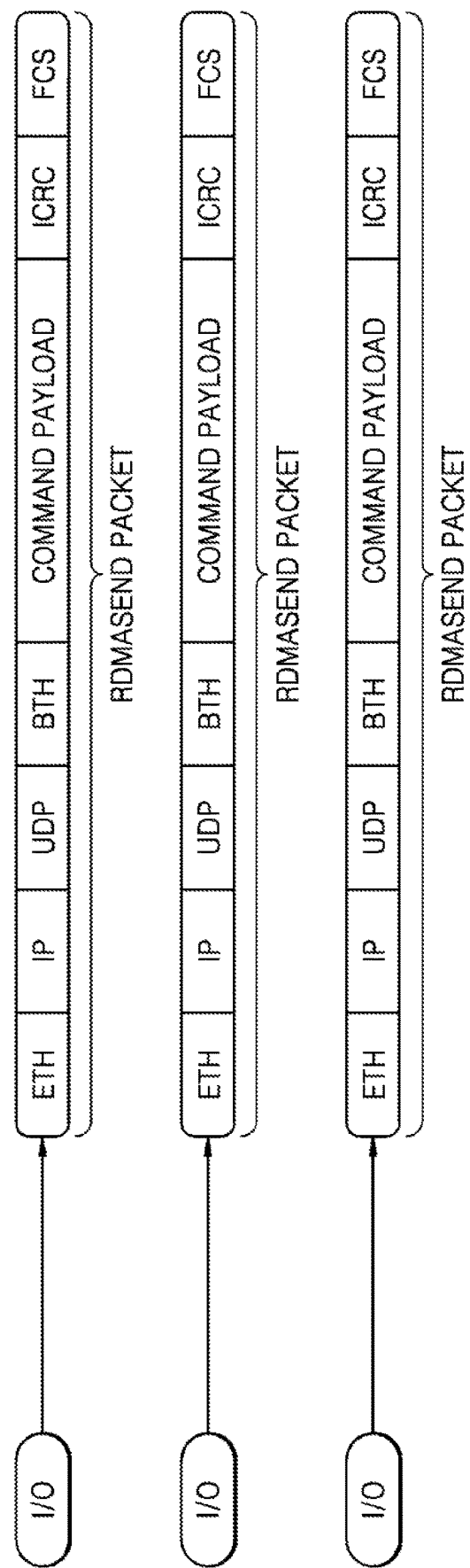
FIG. 1c is an example diagram illustrating an RDMA Send packet formed for an NVMeoF command.

FIG. 1c is an example diagram illustrating the RDMA Send packet formed for the NVMeoF command which can be accompanied with the specific protocol headers added by a transport layer. The specific protocol headers may be at least one of the following: Ethertype value (ETH), an Internet Protocol header (IP: indicating IPv4 or IPV6 protocol), a User Datagram Protocol (UDP) header, a Base Transport Header (BTH), an Invariant Cyclic Redundancy Check (ICRC) and a Frame Check Sequence (FCS), but are not limited as such. For example, each NVMeoF command may be added with 40 Bytes of the BTH, the IP and the UDP header information for forming the RDMA Send packet. Then, the size of the RDMA Send packet may result in 104 Bytes. The size of the RDMA Send packet further results in the transport bandwidth overhead, when at least one RDMA send packets are exchanged between host and target.

Figure 1D:
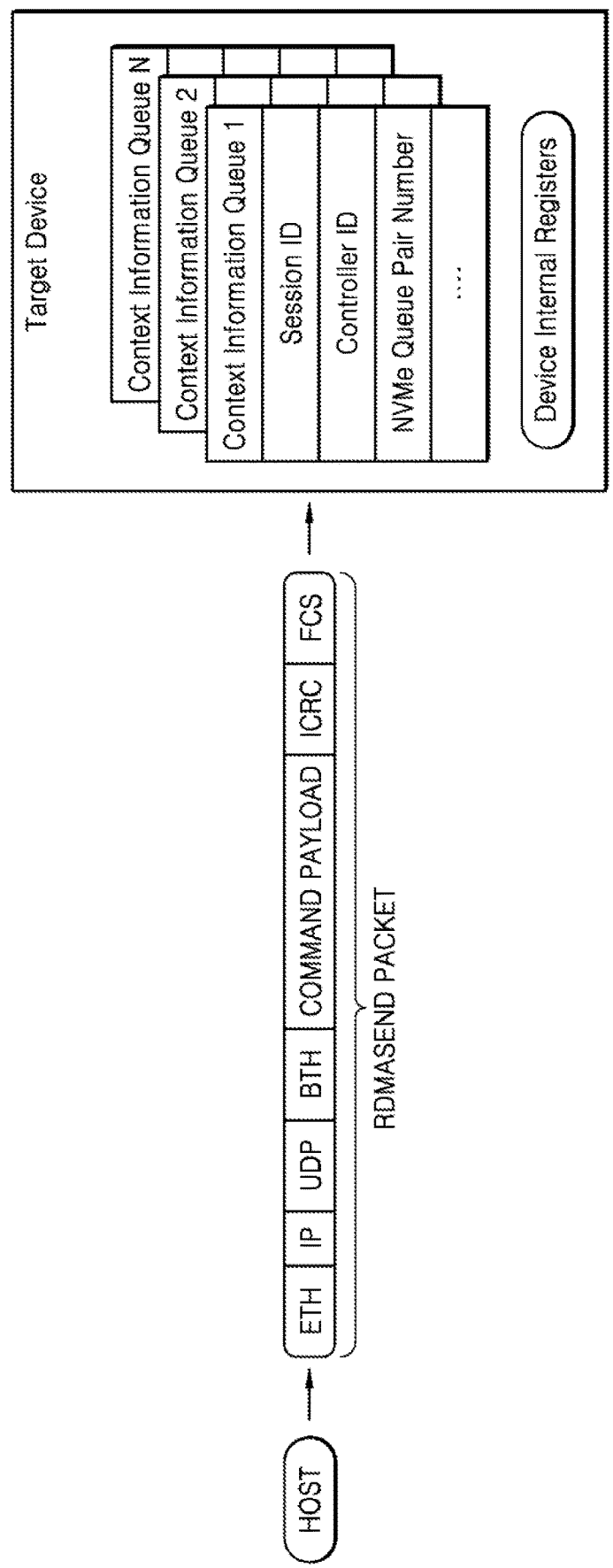
FIG. 1d is an example diagram illustrating context information stored for an RDMA Queue pair in a target device.

FIG. 1d is an example diagram illustrating context information stored for an RDMA Queue pair in the target device. Before initiating the transmission of the NVMeoF command for the I/O request, a Queue Pair (QP) (including the RQ and the SQ) of the host RNIC should associate with a QP of the target RNIC. However, to associate the QPs, the target device may store context information such as, but not limited to, a session id, a controller id, and an NVMe queue pair number (QPn). Furthermore, a demand for hardware resources on the target device may increase linearly based on a number of supported QPs.

Figure 1E:
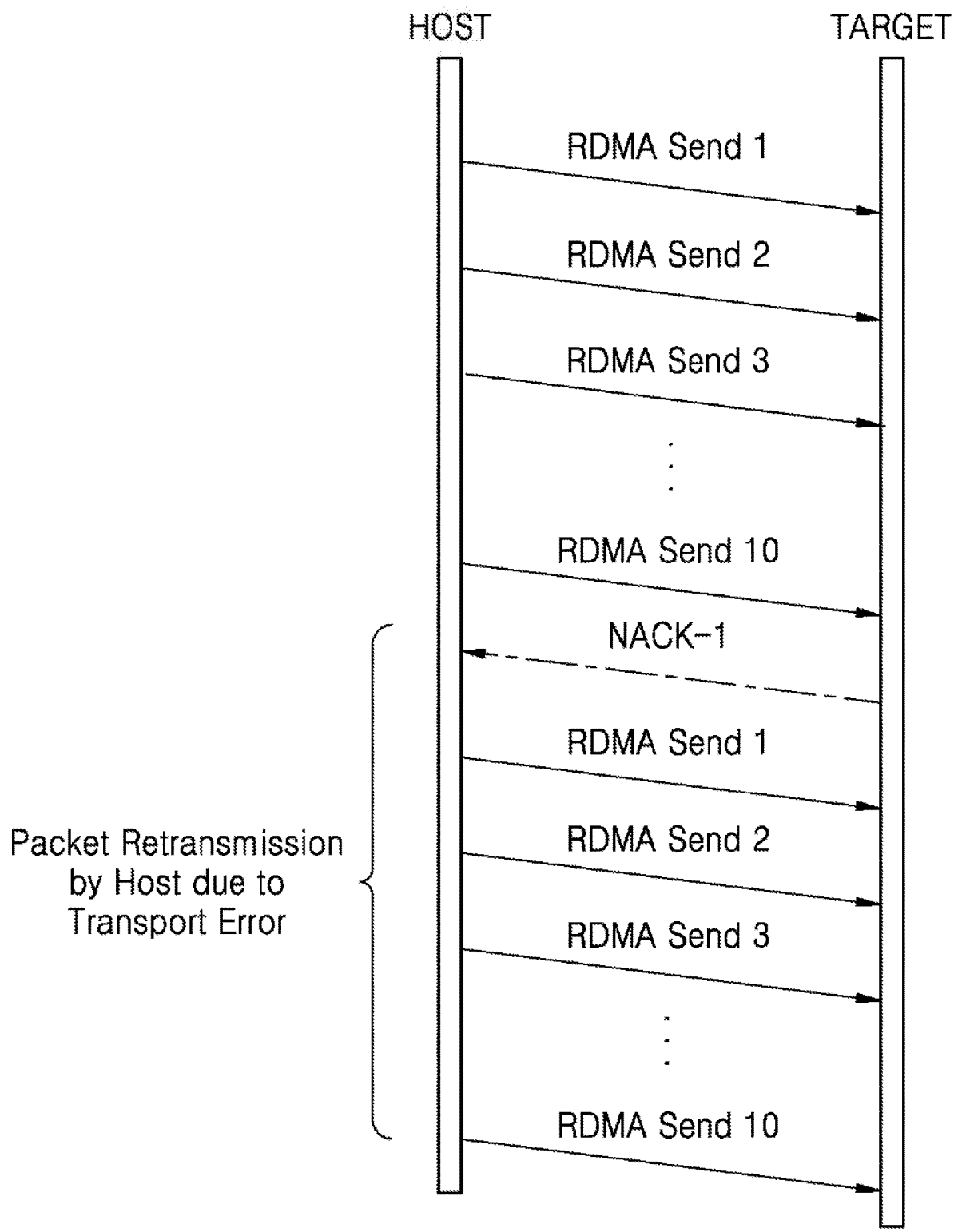
FIG. 1e is an example diagram illustrating retransmission of RDMA Send packets due to a transport error.

FIG. 1e is an example diagram illustrating retransmission of the RDMA Send packets due to a transport error. FIG. 1e illustrates an example scenario, wherein the host has sent 10 RDMA Send packets (corresponding to 10 NVMeoF commands) to the target device using the RDMA Send packets. The host then receives a Negative Acknowledgement (NACK) for the first RDMA Send packet due to a transport error. However, the host may retransmit some of the outstanding RDMA Send packets (i.e. from packet 1 to 10) even though the NACK was received for the first RDMA Send packet.

Figure 2A:
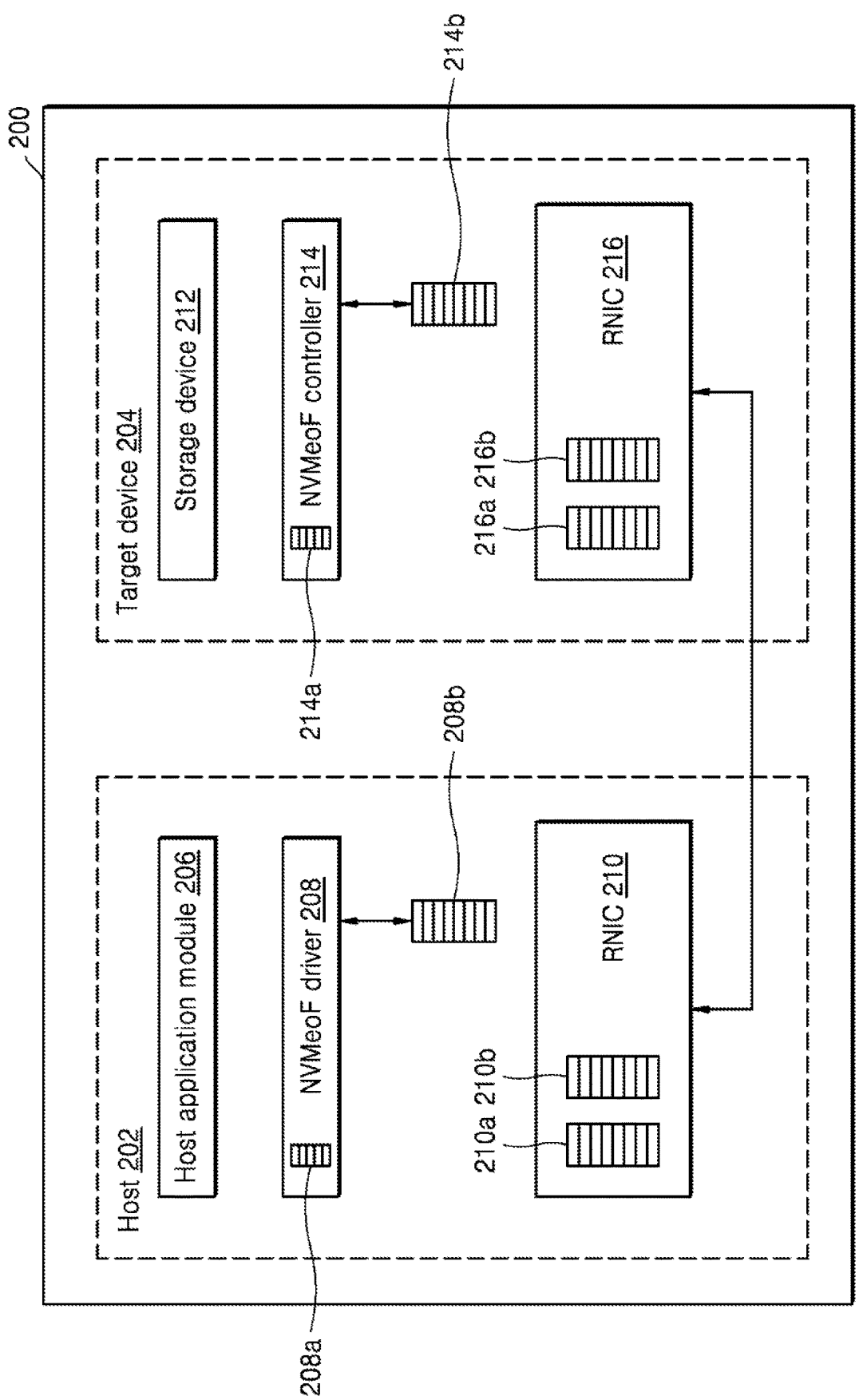
FIG. 2a illustrates an example architecture of an NVMeoF system, according to embodiments of the present disclosure.

FIG. 2a illustrates an example architecture of a Non-Volatile Memory Express over Fabric (NVMeoF) system 200, according to embodiments of the present disclosure. The NVMeoF system 200 includes a host 202 and a target device 204. Examples of the host/NVMe host 202 can be such as, but not limited to, a server, a desktop computer, a hand-held device, a multiprocessor system, a microprocessor based programmable consumer electronics, a laptop, a network computer, a minicomputer, a mainframe computer, and so on. The target device 204 can be any device including Non-Volatile Memory (NVM) subsystem(s) and located remotely from the host 202. Examples of the target device 204 referred herein can be, but not limited to, a server, a multiprocessor system, a microprocessor based programmable consumer electronics, a network computer, a minicomputer, a mainframe computer, and so on. Examples of the NVM subsystem can be, but not limited to, a Non-Volatile Memory Express (NVMe) controller, a NVM device such as flash memory device or the like, a Solid State Drive (SSD) and so on.

The host 202 and the target device 204 communicate with each other according to the NVMeoF standard. The NVMeoF supports three command sets namely fabric commands, Admin commands and Input/Output (I/O) commands. The NVMeoF further allows the host to transfer such commands to the target device for establishing a connection with the target device 204, an NVMe in-band authentication, accessing the NVM subsystem attached to the target device 204 and so on. Furthermore, the NVMeoF enables the host 202 to communicate with the target device 204 using transport fabrics such as, but not limited to, an Ethernet, a Remote Direct Memory Access (RDMA), a Fibre Channel (FC), an InfiniBand and so on. Embodiments herein are explained for managing transmission of the I/O commands/NVMeoF commands from the host 202 to the target device 204 over the RDMA transport fabric/network. Embodiments herein use the terms "I/O commands", "NVMeoF" commands" and so on interchangeably to refer to a command set of the NVMeoF standard used for accessing the target device 204.

The host 202 includes a host application module 206 and an NVMeoF driver 208. Furthermore, the NVMeoF driver 208 of the host 202 may be interfaced with an RDMA Network Interface Card (RNIC) 210 (host RNIC 210). The host RNIC 210 includes a Send Queue (SQ) 210a and a Receive Queue (RQ) 210b.

The host application module 206 can include application programs/computer instructions to operate the host 202 and issues I/O request(s) when the host 202 wants to access the NVM subsystem attached with the target device 204. The NVMeoF driver 208 can be configured to interact with the host RNIC 210 for translating the I/O request(s) initiated by the host application module 206 into the NVMeoF command(s) (according to the NVMeoF Fabrics specification), and transmitting the NVMeoF command(s) to the target device 204. The NVMeoF driver 208 includes a local host queue (LHQ) 208a to accumulate the NVMeoF command(s) initiated by the host application module 206. The NVMeoF driver 208 reserves a host memory (not shown) for a Completion Queue (CQ) 208b that can be used to store Completion queue entries of the NVMeoF command(s). The CQ 208b of the host memory can be reserved for a Queue Pair (QP) (the SQ 210a and the RQ 210b) of the host RNIC 210 for processing the NVMeoF command(s).

Thus, the host 202 may configured to communicate a plurality of NVMeoF commands according to a burst mode or operation. The host 202 may generate the commands, and store them in the LHQ 208a until they are ready to be sent. The plurality of commands may then be combined into a single RDMA write packet, which may be sent to the target device 204.

The target device 204 includes the NVM subsystem. The NVM subsystem includes a storage device 212 and an NVMeoF controller 214. A target RNIC 216 of the target device 204 can include the RDMA QPs namely a Send Queue (SQ) 216a and a Receive Queue (RQ) 216b.

The storage device 212 referred herein can be, but is not limited to, a flash based memory, a flash based Solid State Drive (SSD), a Phase Change Random Access memory (PRAM) based SSD, a Resistive Random Access memory (RRAM) based SSD, and so on. The storage device 212 may include at least one of, a processor (not shown), a non-volatile memory (NVM), and a volatile memory. The NVMeoF controller 214 can be configured to expose non-volatile storage medium/NVM to the host 202 through namespaces. Using a discovery controller (not shown), the host 202 may obtain a list of NVM subsystems associated with the target device 204 and available paths to connect to the NVM subsystem. Furthermore, the host 202 can establish a connection with the NVMeoF controller 214 using the fabric commands. The NVMeoF controller 214 reserves a target memory (not shown) for a Submission Queue (SQ) 214b that can be used to store submission queue entries of the NVMeoF command(s). The SQ 214b of the target memory can be reserved for a QP (the SQ 216a and the RQ 216b) of the target RNIC 216 for processing the NVMeoF command(s). The NVMeoF controller 214 includes a local target queue (LTQ) 214a to accumulate response(s) prepared by the NVMeoF controller 214.

When operating in the burst mode, the target device 204 may receive an RDMA write packet containing a plurality of NVMeoF commands. The NVMeoF commands from the RDMA write packet may be stored in the SQ 214b. When the target device 204 has processed the received NVMeoF commands, it may prepare a plurality of responses and store them in the LTQ 214a. When a number of responses have been accumulated, the target device 204 may then send a burst of responses (i.e., corresponding to the burst of commands) back to the host 202 in an RDMA packet.

When the host 202 receives the commands, it may store them in a CQ 208b. In some cases, the CQ 208b may utilize a reserved portion of a host memory, and the target device 204 may store an RKEY of the CQ 208b for storage of the responses. Similarly, the SQ 214b may be located in a reserved portion of a target device memory, and the host 202 may store an RKEY of the SQ 214b for storing commands.

By transmitting commands and responses in the burst mode, transmission overhead for the RDMA write packets and responses may be reduced, which may increase available bandwidth and reduce hardware requirements for the host 202 and the target device 204.

Figure 2B:
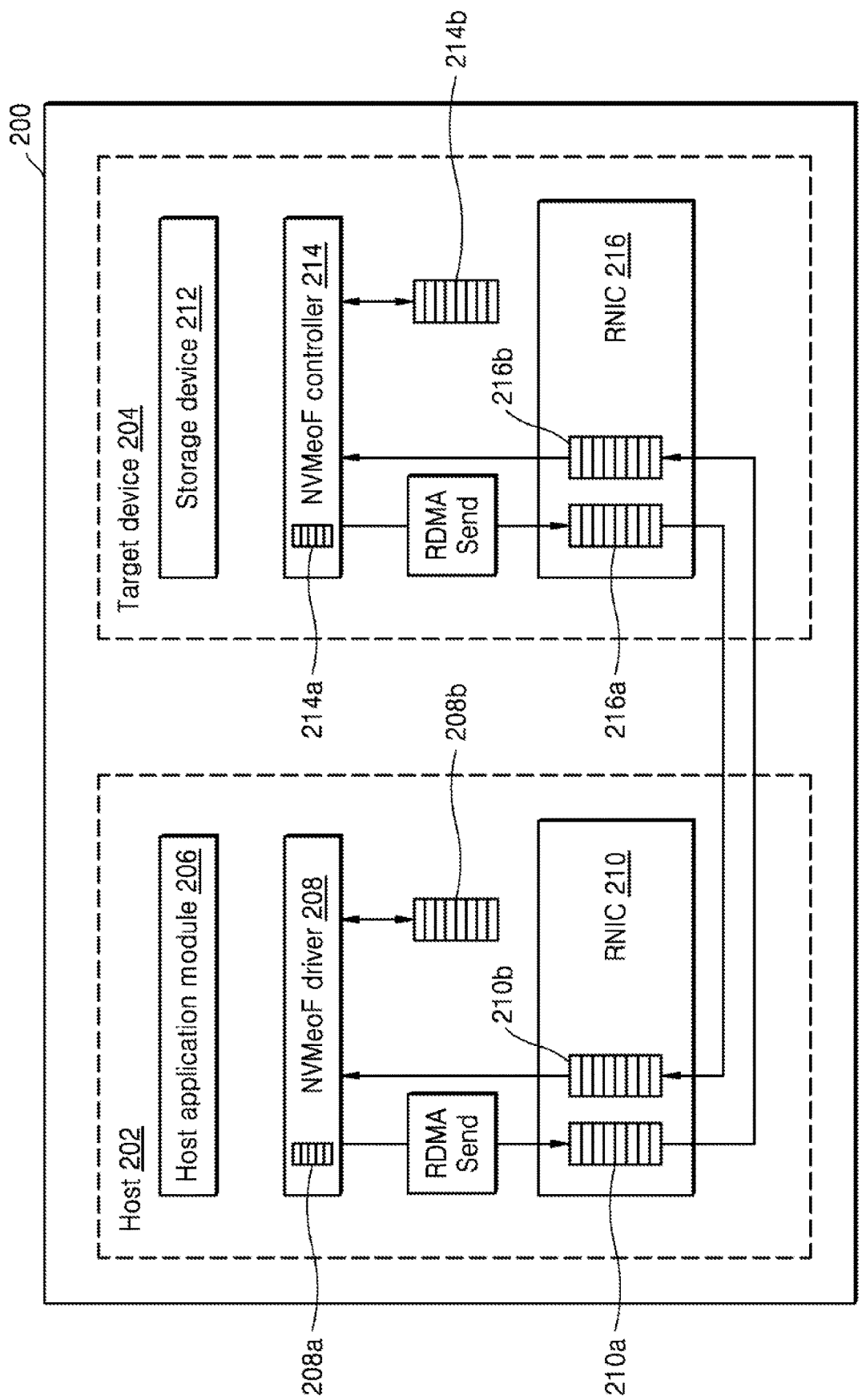
FIG. 2b illustrates an example architecture of initial handshaking between host and target to enable burst mode transfer of NVMeoF commands and responses, according to embodiments of the present disclosure.

FIG. 2b illustrates an example architecture of an initial handshaking between host and target device to enable burst mode transfer of the NVMeoF commands and responses, according to embodiments of the present disclosure. At the host 202, the NVMeoF driver 208 allocates memory region for the CQ 208b of the host 202 and creates Remote Key (RKEY) for the allocated memory region. The NVMeoF driver 208 prepares a Work Queue Element (WQE) using an RDMA Send verb (a specific command of the RDMA). The WQE contains an NVMeoF vendor specific command which includes, an address of the CQ 208b, RKEY information and so on. Furthermore, the NVMeoF driver 208 sends the prepared WQE to the host RNIC 210. Upon receiving the host WQE, the host RNIC 210 adds a protocol specific header to the WQE by forming an RDMA Send packet. The protocol specific header can be at least one of an RDMA over Converged Ethernet (RoCE), an Internet Wide-area RDMA Protocol (iWARP) and so on. The protocol specific header can include header information and fields. The fields can be an Invariant Cyclic Redundancy Code (ICRC) and a Frame Check Sequence (FCS). The header information can include fields such as an RDMA Extended Transport Data (RETH), an Ethertype value (ETH), an Internet Protocol header (IP: indicating IPv4 or IPV6 protocol), a User Datagram Protocol (UDP) header and a Base Transport Header (BTH). The RETH includes DMA Length, a virtual address and the RKEY. The host RNIC 210 transmits the formed RDMA Send packet corresponding to the WQE prepared by the host 202 to the target RNIC 216.

At the target device 204, upon receiving the RDMA Send packet corresponding to the WQE from the host 202, the target RNIC 216 removes the protocol specific header from the RDMA Send packet and obtains the NVMeoF vendor specific command included in the WQE. Furthermore, the target RNIC 216 forwards the NVMeoF vendor specific command to the NVMeoF controller 214. Based on the NVMeoF vendor specific command, the NVMeoF controller 214 stores information about the address of the CQ 208b of the host 202 and the corresponding RKEY. The NVMeoF controller 214 allocates a memory region for the SQ 214b and creates a Remote Key (RKEY) for the allocated memory region. The NVMeoF controller 214 prepares a vendor unique completion entry as a response to the NVMeoF vendor unique command received from the host 202. The vendor unique completion entry includes information about the address of the SQ 214b, and the RKEY information. The RKEY of SQ includes context information such as a session identifier (id), a controller id and an NVMe Queue Pair number (NVMe QPn). The NVMeoF controller 214 further provides the completion queue entry to the target RNIC 216 by preparing the WQE. Upon receiving the WQE corresponding to the completion queue entry, the target RNIC 216 adds the protocol specific header, thus forming an RDMA Send packet corresponding to the completion queue entry. The target RNIC 216 transmits the RDMA Send packet corresponding to the completion queue entry to the host RNIC 210.

At the host 202, upon receiving the RDMA Send packet corresponding to the completion queue entry, the host RNIC 210 stores the RDMA Send packet in the RQ 210b and removes the protocol specific header from RDMA Send packet, thus obtaining the WQE corresponding to the completion queue entry. The host RNIC 210 forwards the obtained WQE corresponding to the completion queue entry to the NVMeoF driver 208. The NVMeoF driver 208 maintains the information about the address of the SQ 214*b* of the target device 204 and the corresponding RKEY (obtained from the WQE corresponding to the completion queue entry).

Figure 3A:
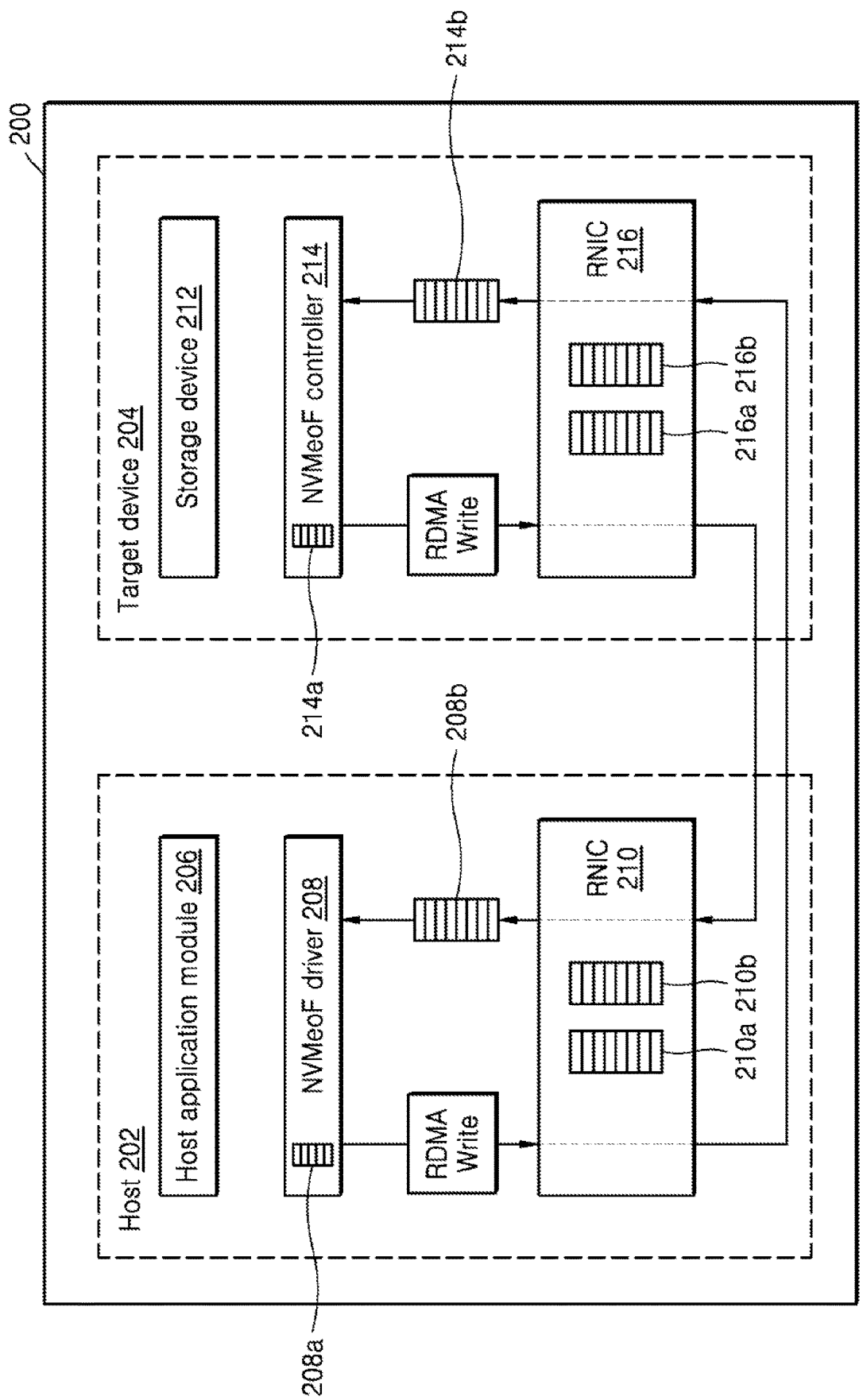
FIG. 3a illustrates an example architecture of an NVMeoF system, wherein an NVMeoF command and an NVMeoF completion response can be transferred between a host and a target device in a burst mode, according to embodiments of the present disclosure.

FIG. 3*a* illustrates an example architecture of the NVMeoF system 200, wherein the NVMeoF command and the NVMeoF completion response can be transferred between the host 202 and the target device 204 in the burst mode, according to embodiments of the present disclosure. As illustrated in FIG. 3*a*, the host application module 206 initiates the I/O request and forwards the I/O request to the NVMeoF driver 208. Upon receiving the I/O request, the NVMeoF driver 208 converts the I/O command (according to the NVMeoF Fabrics specification) into an NVMeoF command and stores the converted NVMeoF command in the LHQ 208*a* for further execution. The NVMeoF driver 208 further employs an arbitration thread, which can be operated using vendor specified turnaround time. When the vendor specific turnaround time expires, the arbitration thread of the NVMeoF driver 208 checks the LHQ 208*a* for the pending NVMeoF command(s). The NVMeoF driver collects the NVMeoF command from the LHQ 208*a* and packs into an RDMA Write buffer. Furthermore, the arbitration thread of the NVMeoF driver 208 transmits the RDMA write buffer to the host RNIC 210 using the RDMA Write verb.

Upon receiving the RDMA Write buffer that includes the NVMeoF command, the host RNIC 210 adds the protocol specific header/single transport header (i.e., RDMA over Converged Ethernet (RoCE), iWARP, or the like) to the RDMA Write buffer, thereby forming the RDMA Write packet. Embodiments herein use the terms such as "protocol specific header", "transport header" and so on to refer to a header format added to the RDMA Write buffer. The RDMA Write packet may include the encapsulated NVMeoF command in the RDMA Write buffer, the header information and fields of the protocol specific header. The fields can be an Invariant Cyclic Redundancy Code (ICRC) and a Frame Check Sequence (FCS).

The header information can include fields such as an RDMA Extended Transport Data (RETH), an Ethertype value (ETH), an Internet Protocol header (IP: indicating IPv4 or IPV6 protocol), a User Datagram Protocol (UDP) header and a Base Transport Header (BTH). The RETH includes DMA Length, a virtual address and the RKEY. Furthermore, the virtual address and the RKEY of SQ can represent a combination of a session identifier (id), a controller id, and a target NVMe Queue pair number (NVMe QPn). Thus, there may be no demand for additional hardware resources on the target device 204 to store the information such as the session id, the controller id and the NVMe QPn. The host RNIC 210 transmits the RDMA Write packet to the target RNIC 216.

At the target device 204, upon receiving the RDMA Write packet, the target RNIC 216 removes the protocol specific header and obtains the NVMeoF command. The target RNIC 216 stores the obtained NVMeoF command in the SQ 214*b* of the target device 204. The NVMeoF controller 214 further checks the SQ 214*b* for the availability of the NVMeoF command(s). Upon determining the availability of the NVMeoF command(s), the NVMeoF controller 214 starts performing Direct Memory Access (DMA) operations using either an RDMA Read packet or the RDMA Write packet. The NVMeoF controller 214 performs the DMA operations based on the type of a request associated with the NVMeoF command. For example, if the NVMeoF Command appears to be a read command, the NVMeoF controller 214 fetches data from the storage device 212 and transmits the data to the host 202 using the RDMA Write packet(s). If the NVMeoF Command appears to be a Write command, the NVMeoF controller 214 fetches data from the host 202 using the RDMA Read packet(s) and writes the fetched data to the storage device 212.

After performing the DMA operations, the NVMeoF controller 214 prepares NVMeoF completion response (according to the NVMeoF Fabrics specification) and stores the NVMeoF completion response in the LTQ 214*a* for further execution. Furthermore, the NVMeoF controller 214 can employ an arbitration thread, which can be operated with the vendor specified turnaround time. When the vendor specific turnaround time expires, the arbitration thread of the NVMeoF controller 214 checks the LTQ 214*a* for the NVMeoF completion response(s) available in the LTQ 214*a*. The arbitration thread of the NVMeoF controller 214 creates an RDMA Write buffer for the NVMeoF completion response available in the LTQ 214*a*. The NVMeoF controller 214 sends the RDMA Write buffer created for the NVMeoF completion response to the target RNIC 216. The target RNIC 216 receives the RDMA Write buffer and adds the protocol specific header (a RoCE, an iWARP and so on) to the RDMA Write buffer, thus forming RDMA Write packet corresponding to the NVMeoF completion response. The target RNIC 216 transmits the RDMA Write packet corresponding to the NVMeoF completion response to the host RNIC 210.

At the host 202, upon receiving the RDMA Write packet, the host RNIC 210 removes the protocol specific header and obtains the NVMeoF completion response. The host RNIC 210 stores the NVMeoF completion response in the pre-registered memory region of the CQ 208*b*. Further, the NVMeoF driver 208 periodically checks the CQ 208*b* for the NVMeoF completion response(s). Upon determining the availability of the completion response in the CQ 208*b*, The NVMeoF driver 208 completes the I/O request and posts a response to the host application module 206.

Figure 3B:
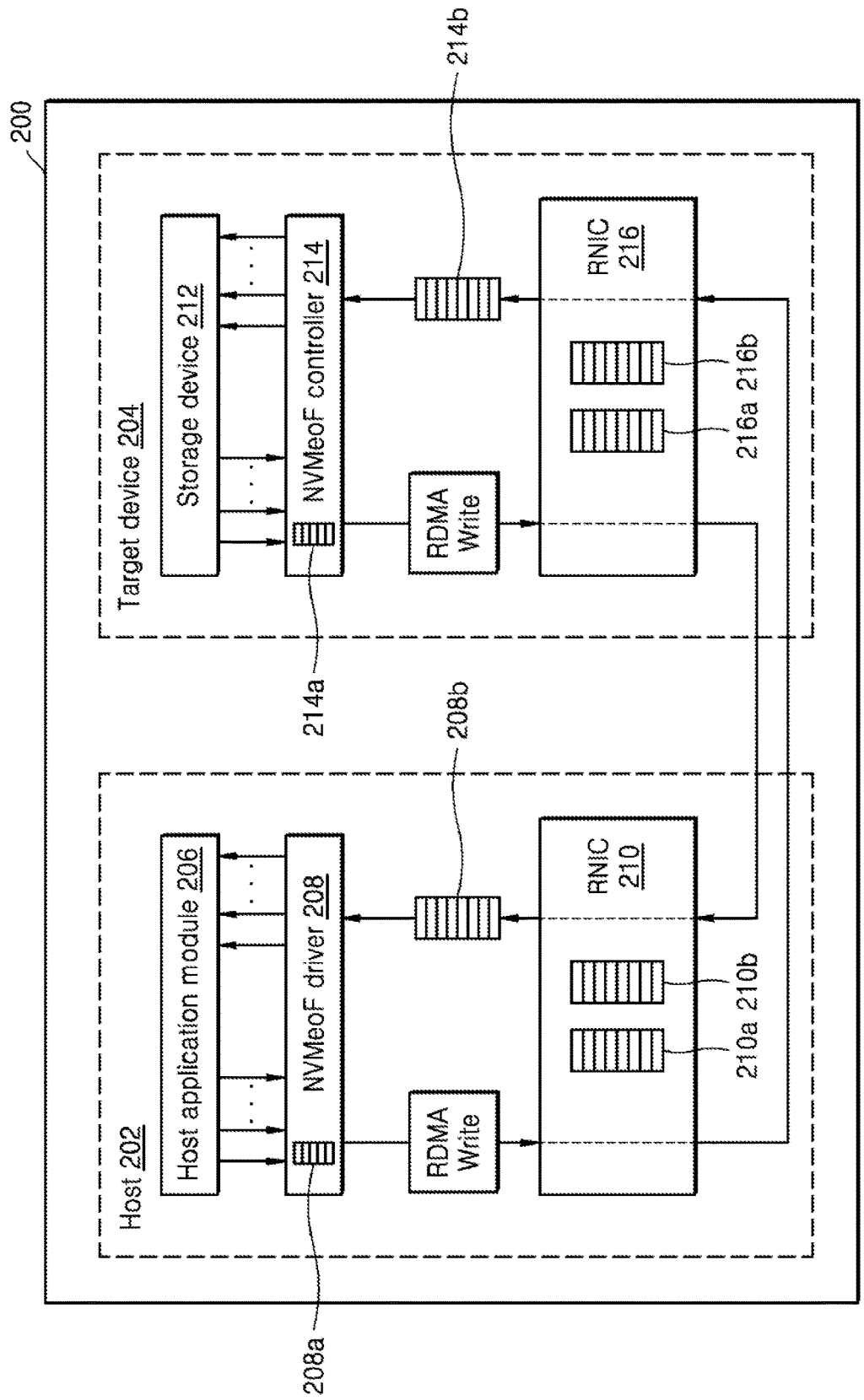
FIG. 3b illustrates an example architecture of an NVMeoF system, wherein NVMeoF commands and NVMeoF completion responses can be transferred between a host and a target device in a burst mode, according to embodiments of the present disclosure.

FIG. 3*b* illustrates an example architecture of an NVMeoF system 200, wherein a plurality of NVMeoF commands and a plurality of NVMeoF completion responses can be transferred between the host 202 and the target device 204 in the burst mode. As illustrated in FIG. 3*b*, the host application module 206 of the host 202 initiates the plurality of I/O requests for accessing the storage device 212 of the target device 204. The host application module 206 forwards the initiated plurality of I/O requests to the NVMeoF driver 208. Upon receiving the plurality of I/O requests, the NVMeoF driver 208 converts the plurality of I/O requests into a plurality of NVMeoF commands and stores the converted plurality of NVMeoF commands in the LHQ 208*a* for further execution. The arbitration thread of the NVMeoF driver 208 checks the LHQ 208*a* for availability of the plurality of NVMeoF commands corresponding to the plurality of I/O commands on expiry of the vendor specific turnaround time. The arbitration thread of the NVMeoF driver 208 collects the available plurality of NVMeoF commands from the LHQ 208*a* and packs the plurality of NVMeoF commands into the RDMA Write buffer.

Furthermore, the arbitration thread of the NVMeoF driver 208 transmits the RDMA Write buffer to the host RNIC 210 using the RDMA Write verb. The host RNIC 210 receives the RDMA Write buffer that includes the plurality of NVMeoF commands and adds the single transport header/protocol specific header (a RoCE, an iWARP and so on) to the RDMA Write buffer, thereby forming a single RDMA Write packet corresponding to the plurality of NVMeoF commands. The single RDMA Write packet may include the plurality of NVMeoF commands in the buffer, the single transport header/protocol specific header for the plurality of NVMeoF commands. The single transport header can include the header information and fields. The fields can be an Invariant Cyclic Redundancy Code (ICRC) and a Frame Check Sequence (FCS). The header information can include fields such as an RDMA Extended Transport Data (RETH), an Ethertype value (ETH), an Internet Protocol header (IP: indicating IPv4 or IPV6 protocol), a User Datagram Protocol (UDP) header and a Base Transport Header (BTH). The RETH includes a DMA Length, a virtual address and an RKEY. Further, the virtual address and the RKEY of SQ can represent a combination of a session identifier (id), a controller id and a target NVMe Queue pair number (NVMe QPn). Thus, there may be no demand for additional hardware resources on the target device 204 to store the information such as the session id, the controller id and the NVMe QPn. The host RNIC 210 transmits the RDMA Write packet corresponding to the plurality of NVMeoF commands to the target RNIC 216.

At the target device 204, upon receiving the RDMA Write packet corresponding to the plurality of NVMeoF commands, the target RNIC 216 removes the protocol specific header and obtains the plurality of NVMeoF commands corresponding to the plurality of I/O requests. The target RNIC 216 stores the obtained plurality of NVMeoF commands corresponding to the plurality of I/O requests in the pre-registered memory region of SQ 214b. The NVMeoF controller 214 can check periodically for the availability of the plurality of NVMeoF commands corresponding to the plurality of I/O requests in the SQ 214b. On determining the availability, the NVMeoF controller 214 fetches the plurality of NVMeoF commands from the SQ 214b and performs the DMA operations depending on the associated type of the plurality of NVMeoF commands. For example, if an NVMeoF command of the plurality of NVMeoF commands appears to be a read command, the NVMeoF controller 214 fetches data from the storage device 212 and transmits the data to the host 202 using the RDMA Write packet(s). If the NVMeoF Command appears to be a Write command, the NVMeoF controller 214 fetches data from the host 202 using the RDMA Read packet(s) and writes the fetched data to the storage device 212.

After performing the DMA operations, the NVMeoF controller 214 prepares a plurality of NVMeoF completion responses and stores the plurality of NVMeoF completion responses in the LTQ 214a for further execution. Furthermore, the NVMeoF controller 214 can employ an arbitration thread, which can be operated with the vendor specific turnaround time. When the vendor specific turnaround time expires, the arbitration thread of the NVMeoF controller 214 checks the LTQ 214a for the plurality of NVMeoF completion responses available in the LTQ 214a. The arbitration thread of the NVMeoF controller 214 creates an RDMA Write buffer for the plurality of NVMeoF completion responses available in the LTQ 214a. The NVMeoF controller 214 sends the RDMA Write buffer created for the plurality of NVMeoF completion responses to the target RNIC 216. The target RNIC receives the RDMA Write buffer and adds the single protocol specific header (for the plurality of NVMeoF completion responses), thus forming the RDMA Write packet corresponding to the plurality of NVMeoF completion responses. The target RNIC 216 transmits the RDMA Write packet corresponding to the plurality of NVMeoF completion responses to the host RNIC 210.

At the host 202, upon receiving the RDMA Write packet corresponding to the plurality of NVMeoF completion responses, the host RNIC 210 removes the protocol specific header and obtains the plurality of NVMeoF completion responses. The host RNIC 210 stores the plurality of NVMeoF completion responses in the pre-registered memory region of the CQ 208b. Furthermore, the NVMeoF driver 208 periodically checks the CQ 208b for the plurality of NVMeoF completion responses. On determining the availability of the plurality of completion responses in the CQ 208b, the NVMeoF driver 208 completes the plurality of I/O requests and posts the plurality of responses corresponding to plurality of the I/O requests to the host application module 206. Thus, in the burst mode, a single RDMA Write packet including the plurality of NVMeoF commands and a single RDMA Write packet including the plurality of NVMeoF completion responses can be exchanged between the host 202 and the target device 204, which results in efficient use of available RDMA network bandwidth.

FIGS. 2a, 2b, 3a and 3b show exemplary units of the NVMeoF system 200, but it is to be understood that other embodiments are not limited thereon. In other embodiments, the NVMeoF system 200 may include less or more number of units. Furthermore, the labels or names of the units are used only for illustrative purpose and does not limit the scope of the embodiments herein. One or more units can be combined together to perform same or substantially similar function in the NVMeoF system 200.

FIG. 4 illustrates a flow diagram 400 of a method for managing the transfer of the NVMeoF commands and the NVMeoF responses from the host 202 to the target device 204 in the burst mode, according to embodiments of the present disclosure.

At step 402, the method includes, initiating and converting, by the host 202, the Input/output (I/O) request(s) into the NVMeoF command(s) for accessing the storage device 212 associated with the target device 204.

At step 404, the method includes transmitting, by the host (202), the NVMeoF command(s) in the burst mode using the RDMA Write packet to the target device 204. The host 202 accumulates the NVMeoF command(s) in the LHQ 208a. The host 202 further collects the available NVMeoF command(s) using the arbitration thread from the LHQ 208a after expiry of the vendor specific time. The host 202 stores the accumulated NVMeoF command(s) in the RDMA Write buffer. The host 202 adds the protocol specific header to the RDMA Write buffer by forming the RDMA Write packet. The RDMA Write packet can include the NVMeoF command(s) encapsulated in the RDMA Write buffer and the single transport header for the NVMeoF command(s). The host 202 sends the RDMA Write packet corresponding to the NVMeoF command(s) to the target device 204 through the host RNIC 210.

At step 406, the method includes posting, by the target device 204, the NVMeoF completion response(s) for the NVMeoF command(s) in the burst mode using the RDMA Write packet to the host 202. Upon receiving the RDMA Write packet corresponding to the NVMeoF commands, the target device 204 removes the protocol specific header from the RDMA Write packet received from the host 202 and obtains the NVMeoF command(s). The target device 204 stores the NVMeoF command(s) in the pre-registered memory of the SQ 214b of the target device 204. The target device 204 performs the DMA operations to write or read the data from the storage device 212 based on the type of command associated with the NVMeoF command(s). After performing the DMA operation(s), the target device 204 prepares the NVMeoF completion response(s) and stores the NVMeoF completion response(s) in the LTQ 214a for further execution. The target device 204 extracts the available NVMeoF completion response(s) in the LTQ 214a on determining the expiry of the vendor specific time and packs the NVMeoF completion response(s) in the RDMA Write buffer. The target device 204 forms the RDMA Write packet by adding the protocol specific header to the RDMA Write buffer including the NVMeoF completion response(s). The RDMA Write buffer formed at the target device 204 includes the NVMeoF completion response(s) encapsulated in the RDMA Write buffer and the single transport header for the NVMeoF completion response(s). The target device 204 transmits the RDMA Write packet corresponding to the NVMeoF completion response(s) to the host 202 through the target RNIC 216. Upon receiving the RDMA Write packet from the target device 204, the host 202 obtains the NVMeoF completion response(s) by removing the single protocol specific header/transport header from the RDMA Write packet. The host 202 stores the NVMeoF completion responses in the pre-registered memory region of CQ 208b. The host 202 further completes the I/O request(s) based on the NVMeoF completion responses.

The various actions, acts, blocks, steps, or the like in the method and the flow diagram 400 may be performed in the order presented, in a different order or simultaneously. Furthermore, in some embodiments, some of the actions, acts, blocks, steps, or the like may be omitted, added, modified, skipped, or the like without departing from the scope of the present disclosure.

Figure 5:
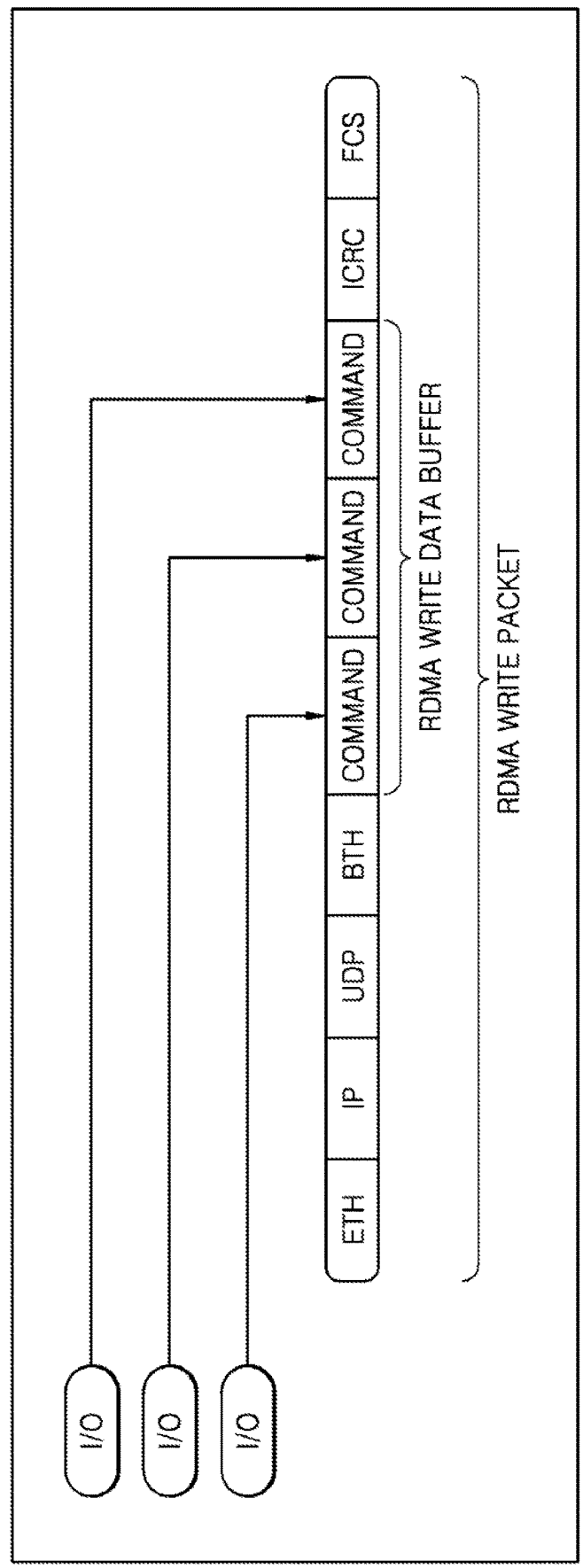
FIG. 5 is an example diagram illustrating an RDMA Write packet formed for NVMeoF commands, according to embodiments of the present disclosure.

FIG. 5 illustrates an example diagram of the RDMA Write packet formed for the NVMeoF commands, according to embodiments of the present disclosure. Embodiments of the present disclosure may form a single RDMA Write packet for multiple NVMeoF commands and add the single transport header for the NVMeoF commands in the burst mode. For example, the host 202 may initiate three NVMeoF commands. The host 202 encapsulates the three NVMeoF commands into the single RDMA Write buffer. Furthermore, the host 202 adds the single protocol specific header for the three NVMeoF commands. The single protocol specific header can include the fields such as the ETH, the IP, the UDP and the RETH. Thus, adding the single protocol specific header for the NVMeoF commands results in efficient use of available RDMA network bandwidth.

By combining multiple NVMeoF commands in a single packet (e.g., in a burst mode), transmission overhead for the RDMA write packets and responses may be reduced, which may increase available bandwidth and reduce hardware requirements for the host 202 and the target device 204.

Figure 6:
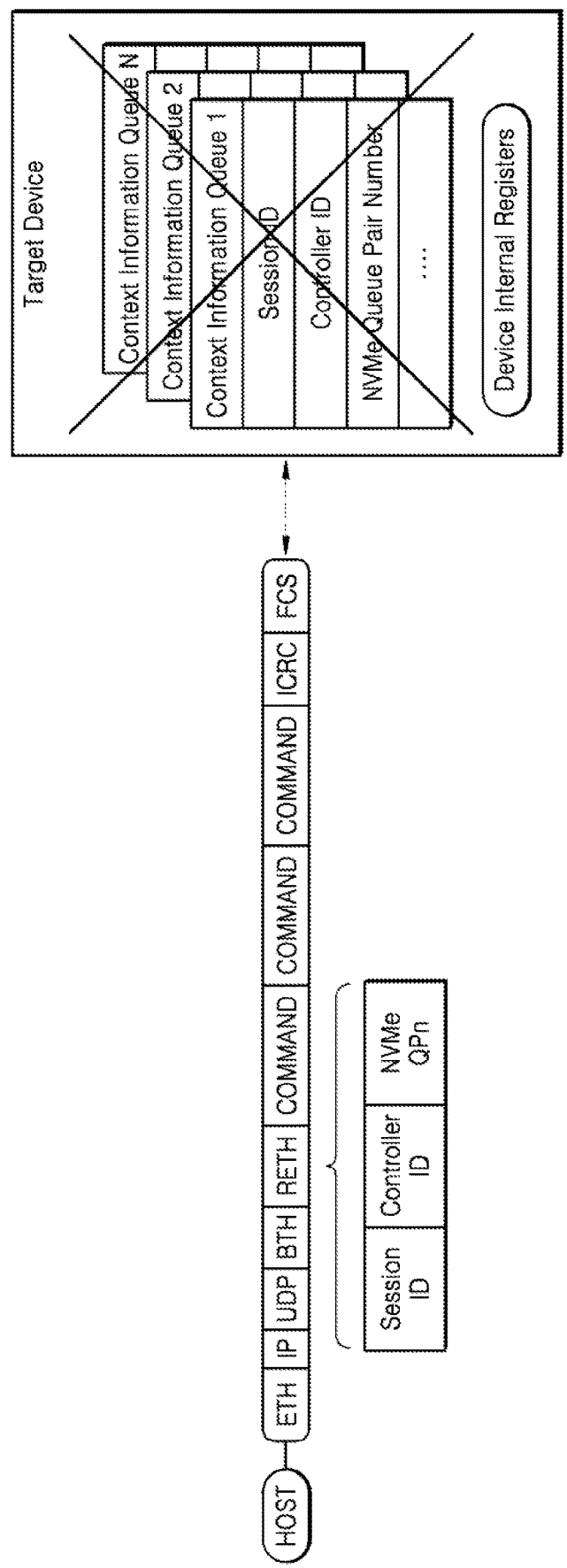
FIG. 6 is an example diagram illustrating the elimination of the necessity to store context information for an RDMA Queue pair in a target device, according to some embodiment.

FIG. 6 illustrates an example diagram for the elimination of the necessity to store context information for an RDMA Queue pair in the target device, according to embodiments of the present disclosure as disclose herein; Embodiments herein enable the host 202 to transfer the NVMeoF commands to the target device 204 using the single RDMA Write packet. The RDMA Write packet contains protocol specific header and the NVMeoF commands. The single protocol specific header of the RDMA Write packet includes the RETH field, which provides the context information for processing the NVMeoF commands. The virtual address and the RKEY of the RETH can represent context information about the session id, the controller id and the NVMe QPn. As part of the initialization sequence/action, the target device 204 shares the virtual address and the RKEY of the SQ 214b with the host 202. Furthermore, the NVMeoF commands can be executed without saving the context information on the target device 204 because the RETH field includes context information. Thus, there may be no demand for additional hardware resources on the target device 204 to store the information such as the session id, the controller id and the NVMe QPn.

Figure 7:
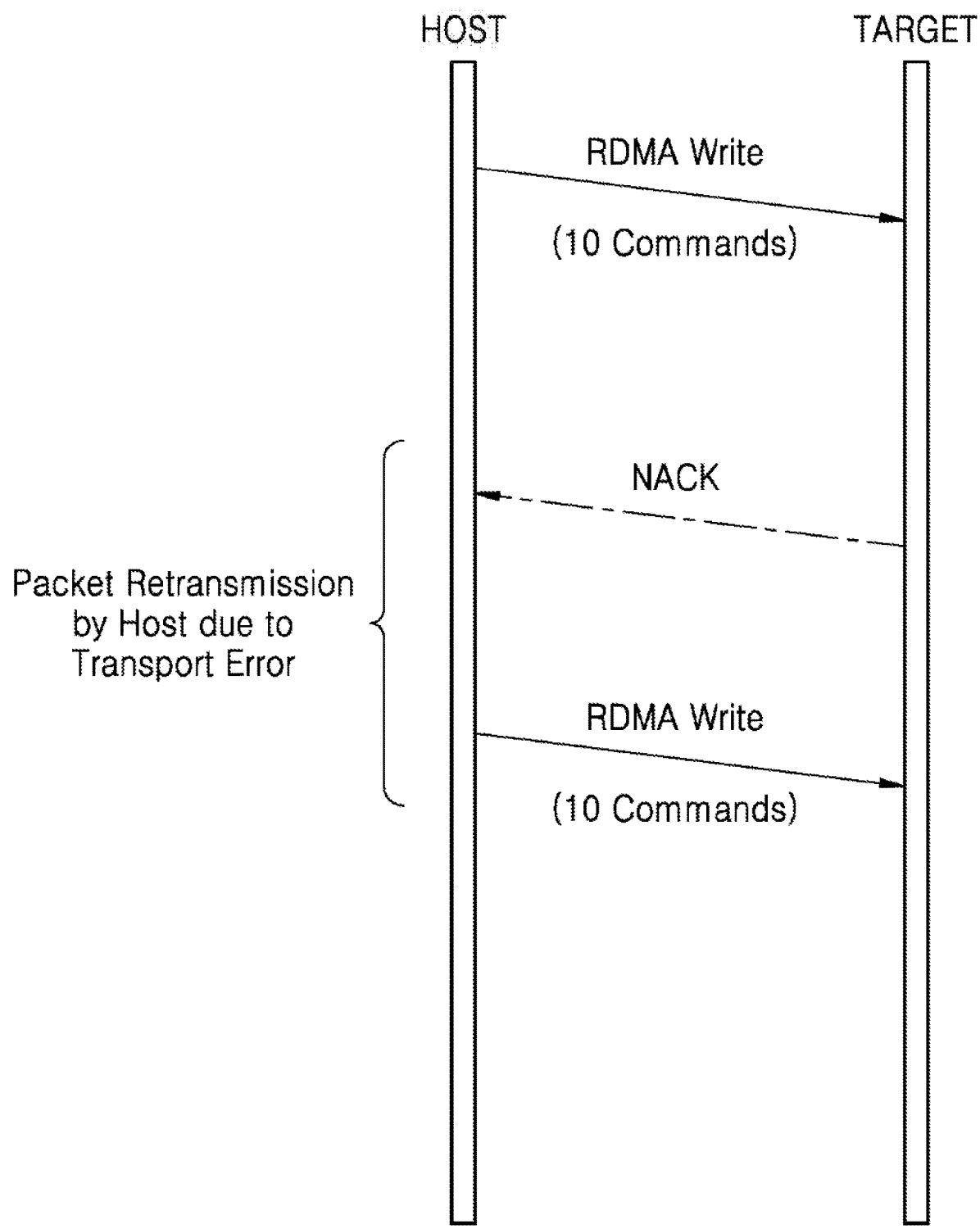
FIG. 7 is an example diagram illustrating retransmission of NVMeoF commands using an RDMA Write packet due to an occurrence of a transmission error, according to embodiments of the present disclosure.

FIG. 7 illustrates an example diagram of retransmission of the NVMeoF commands using the RDMA Write packet due to an occurrence of a transmission error, according to embodiments of the present disclosure. In an example scenario, the host 202 has sent 10 NVMeoF commands in burst mode using the RDMA Write packet to the target device 204. Furthermore, the host 202 receives a Negative Acknowledgement (NACK) from the target device 204 indicating a transmission error for a first NVMeoF command. On identifying the transmission error, the host 202 retransmits the single RDMA Write packet which includes a single transport header and 10 NVMeoF commands to the target device 204. Thus, adding of the single transport header for the at least one NVMeoF commands reduces header overhead.

The embodiments disclosed herein can be implemented through at least one software program running on at least one hardware device and performing network management functions to control the elements. The elements shown in FIGS. 2a-3b can be at least one hardware device, or a combination of hardware devices and software modules.

The embodiments disclosed herein describe methods and systems for managing transfer of Non-Volatile Memory Express over Fabric (NVMeoF) commands/responses between a host and a target device over a Remote Direct Memory Access (RDMA). Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in an embodiment through or together with a software program written in e.g. Very high speed integrated circuit Hardware Description Language (VHDL) another programming language, or implemented by one or more VHDL or several software modules being executed on at least one hardware device. The hardware device can be any kind of portable device that can be programmed. The device may also include means which could be e.g. hardware means like e.g. an Application Specific Integrated Circuit (ASIC), or a combination of hardware and software means, e.g. an ASIC and an FPGA, or at least one microprocessor and at least one memory with software modules located therein. The method embodiments described herein could be implemented partly in hardware and partly in software. Alternatively, the present disclosure may be implemented on different hardware devices, e.g. using a plurality of CPUs.

The foregoing description of the specific embodiments will fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of embodiments, those skilled in the art will recognize that the embodiments herein can be practiced with modification within the spirit and scope of the embodiments as described herein.

What is claimed is:

1. A Non-Volatile Memory Express over Fabric (NVMeoF) system comprising:
a host and a target device;
wherein the host is configured for:
initiating and converting a plurality of Input/output (I/O) requests into a plurality of NVMeoF commands for accessing a storage device associated with the target device;
packing the plurality of NVMeoF commands in an RDMA Write buffer;
forming an RDMA Write packet corresponding to the plurality of NVMeoF commands by adding a single protocol specific header to the RDMA Write buffer, wherein the RDMA Write packet formed by the host includes the plurality of NVMeoF commands packed in the RDMA Write buffer and the single protocol specific header for the plurality of NVMeoF commands; and
transmitting the plurality of NVMeoF commands in a burst mode in the Remote Direct Memory Access (RDMA) Write packet to the target device; and
wherein the target device is configured for:
posting a plurality of NVMeoF completion responses for the plurality of NVMeoF commands in the burst mode in the RDMA Write packet to the host.

2. The NVMeoF system of claim 1, wherein the host is further configured for: completing the plurality of initiated I/O requests based on the plurality of NVMeoF completion responses received from the target device.

3. The NVMeoF system of claim 2, wherein the host is further configured for:
pre-registering a memory region for a Completion Queue (CQ) of the host by preparing a Remote Key (RKEY) for the CQ;
creating a Work Queue Element (WQE) using an RDMA Send verb, wherein the WQE includes an NVMeoF vendor specific command and the NVMeoF vendor specific command includes an address of the CQ and the RKEY prepared for the CQ;
forming an RDMA Send packet by adding at least one protocol specific header to the NVMeoF vendor specific command of the WQE; and
transmitting the RDMA Send packet corresponding to the NVMeoF vendor specific command of the WQE to the target device.

4. The NVMeoF system of claim 3, wherein the target device is further configured for:
removing the at least one protocol specific header from the RDMA Send packet received from the host to obtain the NVMeoF vendor specific command;
storing information about the address of the CQ and the RKEY prepared for the CQ using the obtained NVMeoF vendor specific command;
creating a memory region for a Submission Queue (SQ) of the target device by preparing an RKEY for the SQ, wherein the RKEY of the SQ indicates a combination of a session identifier (id), a controller id and NVMe Queue pair number (NVMe QPn);
creating a WQE using the RDMA Send verb, wherein the WQE includes a vendor unique completion entry in response to the NVMeoF vendor specific command and the vendor unique completion entry includes an address of the SQ and the RKEY prepared for the SQ;
preparing the RDMA Send packet by adding the at least one protocol specific header to the vendor unique completion entry of the WQE; and
transmitting the RDMA Send packet corresponding to the vendor unique completion entry to the host.

5. The NVMeoF system of claim 4, wherein the host is further configured for:
removing the at least one protocol specific header from the RDMA Send packet received from the target device to obtain the vendor unique completion entry; and
storing the address of the SQ and the RKEY prepared for the SQ using the obtained vendor unique completion entry.

6. The NVMeoF system of claim 5, wherein the host is further configured for:
accumulating the plurality of NVMeoF commands corresponding to the plurality of I/O requests in a local host queue (LHQ); and
collecting the accumulated plurality of NVMeoF commands from the LHQ based on an expiration of a vendor specific turnaround time.

7. The NVMeoF system of claim 6, wherein the single protocol specific header includes an RDMA Extended Transport Data (RETH), an Ethertype value (ETH), an Internet Protocol header (IP), a User Datagram Protocol (UDP) header, a Base Transport Header (BTH) an Invariant Cyclic Redundancy Code (ICRC) and a Frame Check Sequence (FCS), wherein the RETH includes DMA length, Virtual address and a Remote Key (RKEY).

8. The NVMeoF system of claim 1, wherein the target device is further configured for:
receiving the RDMA Write packet from the host;
removing a single protocol specific header from the RDMA Write packet received from the host to obtain the plurality of NVMeoF commands;
storing the obtained plurality of NVMeoF commands in a pre-registered memory region of a Submission Queue (SQ);
performing at least one Direct Memory Access (DMA) operation based on a type of command associated with the plurality of NVMeoF commands stored in the pre-registered memory region of the SQ;
preparing the plurality of NVMeoF completion responses after performing the at least one DMA operation;
accumulating the prepared plurality of NVMeoF completion responses in a local target queue (LTQ);
collecting the accumulated plurality of NVMeoF completion responses from the LTQ based on an expiration of a vendor specific turnaround time;
packing the collected plurality of NVMeoF completion responses in an RDMA Write buffer;
forming the RDMA Write packet corresponding to the plurality of NVMeoF completion responses by adding the single protocol specific header to the RDMA Write buffer, wherein the RDMA Write packet formed by the target device includes the plurality of NVMeoF completion responses packed in the RDMA Write buffer and the single protocol specific header for the plurality of NVMeoF completion responses; and
transmitting the formed RDMA Write packet corresponding to the plurality of NVMeoF completion responses to the host.

9. The NVMeoF system of claim 8, wherein the target device is further configured for:
fetching and transmitting data from the storage device to the host using at least one RDMA Write packet on determining that the plurality of NVMeoF commands includes a read command; and fetching and storing data from the host to the storage device using at least one RDMA Read packet on determining that the plurality of NVMeoF commands includes a write command.

10. The NVMeoF system of claim 8, wherein the host is further configured for:

removing the single protocol specific header from the RDMA Write packet received from the target device to obtain the plurality of NVMeoF completion responses;

storing the plurality of NVMeoF completion responses in the pre-registered memory region of the CQ; and completing the at least one I/O request based on the stored plurality of NVMeoF completion responses.

11. A host of a Non-Volatile Memory Express over Fabric (NVMeoF) system comprising of a target device, wherein the host is configured for:

initiating and converting a plurality of Input/output (I/O) requests into a plurality of NVMeoF commands for accessing a storage device associated with the target device;

packing the plurality of NVMeoF commands in an RDMA Write buffer;

forming a Remote Direct Memory Access (RDMA) Write packet corresponding to the plurality of NVMeoF commands by adding a single protocol specific header to the plurality of NVMeoF commands packed in the RDMA Write buffer, wherein the single protocol specific header corresponds to the plurality of NVMeoF commands; and transmitting the RDMA Write packet corresponding to the plurality of NVMeoF commands to a pre-registered memory region of the target device.

12. The host of claim 11, wherein the host is further configured for:

accumulating a plurality of NVMeoF commands in a local host queue (LHQ); and collecting the accumulated plurality of NVMeoF commands from the LHQ based on an expiration of a vendor specific turnaround time.

13. A target device of a Non-Volatile Memory Express over Fabric (NVMeoF) system comprising of a host, wherein the target device is configured for:

forming a Remote Direct Memory Access (RDMA) Write packet corresponding to a plurality of NVMeoF completion responses upon receiving the RDMA Write packet corresponding to the plurality of NVMeoF commands from the host;

transmitting the RDMA Write packet corresponding to the plurality of NVMeoF completion responses to a pre-registered memory region of the host, wherein the host uses the plurality of NVMeoF completion responses to complete a plurality of I/O requests;

removing a single protocol specific header from the RDMA Write packet received from the host to obtain the plurality of NVMeoF commands;

storing the obtained plurality of NVMe commands in the pre-registered memory region; and performing at least one Direct Memory Access (DMA) operation based on a type of command associated with the obtained plurality of NVMeoF commands.

14. The target device of claim 13, wherein the target device is further configured for:

preparing the plurality of NVMeoF completion responses after performing the at least one DMA operation;

accumulating the prepared plurality of NVMeoF completion responses in a local target queue (LTQ);

collecting the accumulated plurality of NVMeoF completion responses from the LTQ based on an expiration of a vendor specific turnaround time;

packing the collected plurality of NVMeoF completion responses in an RDMA Write buffer; and forming the RDMA Write packet corresponding to the plurality of NVMeoF completion responses by adding the single protocol specific header to the RDMA Write buffer, wherein the RDMA Write packet formed by the target device includes the plurality of NVMeoF completion responses packed in the RDMA Write buffer and the single protocol specific header for the plurality of NVMeoF completion responses.

15. A Non-Volatile Memory Express over Fabric (NVMeoF) system comprising:

a host and a target device;

wherein the host comprises:

an NVMeoF driver configured for:

receiving and translating a plurality of Input/Output (I/O) requests initiated by a host application module into a plurality of NVMeoF commands;

accumulating the plurality of NVMeoF commands in a local host queue (LHQ); and packing the plurality of NVMeoF commands accumulated in the LHQ in a Remote Direct Memory Access (RDMA) write buffer; and a host RDMA network interface card (NIC) configured for:

configuring a single protocol specific header to the accumulated plurality of NVMeoF commands in the RDMA write buffer; and sending the RDMA write buffer to the target device using an RDMA Write packet;

and wherein the target device comprises:

an NVMeoF controller configured for:

executing the RDMA Write packet received from the host; and packing a plurality of NVMeoF completion responses to the executed plurality of NVMeoF commands in the RDMA Write packet in an RDMA write buffer having the single protocol specific header; and a target RDMA Network Interface Card (RNIC) configured for:

sending the packed plurality of NVMeoF completion responses to the host using the RDMA Write packet.

* * * * *